(12) United States Patent
Dent

(10) Patent No.: US 8,059,697 B2
(45) Date of Patent: Nov. 15, 2011

(54) REDUCED PEAK-TO-RMS RATIO MULTICODE SIGNAL

(75) Inventor: Paul Dent, Pittsboro, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 752 days.

(21) Appl. No.: 12/166,883

(22) Filed: Jul. 2, 2008

(65) Prior Publication Data

US 2010/0002670 A1  Jan. 7, 2010

(51) Int. Cl.
*H04B 1/00* (2006.01)
*H04K 1/10* (2006.01)
(52) U.S. Cl. ........................ 375/146; 375/260
(58) Field of Classification Search .............. 375/146, 375/260; 370/320, 335, 341, 442
See application file for complete search history.

(56) References Cited

U.S. PATENT DOCUMENTS

| 4,084,337 | A | 4/1978 | Tucker |
| 4,597,090 | A | 6/1986 | Forney |
| 7,173,973 | B2* | 2/2007 | Borran et al. ............... 375/260 |
| 7,310,379 | B2* | 12/2007 | Sibecas et al. ............... 375/267 |
| 7,929,498 | B2* | 4/2011 | Ozluturk et al. ............ 370/335 |
| 2002/0197966 | A1 | 12/2002 | Taskinen |
| 2008/0304594 | A1* | 12/2008 | Schell et al. ............... 375/300 |

FOREIGN PATENT DOCUMENTS

WO  WO 2008/038210 A  4/2008

OTHER PUBLICATIONS

Welti, G.; Jhong Lee "Digital Transmission with Four Dimensional modulation" Information Theory, IEEE Transactions on vol. 20, Issue 4, Jul. 1974 pp. 497-502.

* cited by examiner

*Primary Examiner* — Don N Vo

(57) ABSTRACT

A transmitter and a method are described herein that generate a reduced peak-to-rms ratio multicode radio signal which helps to conserve battery life and increase the communication range and average data throughput rate.

13 Claims, 5 Drawing Sheets

REDUCED PEAK-TO-RMS RATIO MULTICODE SIGNAL

CROSS REFERENCE TO RELATED APPLICATION

This application is related to U.S. patent application Ser. No. 12/166910 filed concurrently herewith and entitled "Multi-Dimensional Signal of Reduced Peak-to-RMS Ratio". The contents of this document are hereby incorporated by reference herein.

TECHNICAL FIELD

The present invention relates in general to the wireless telecommunications field and, in particular, to a transmitter and a method for generating a reduced peak-to-rms ratio multicode radio signal which helps to conserve battery life and increase the communication range and average data throughput rate.

BACKGROUND

The following abbreviations are herewith defined, at least some of which are referred to within the following description of the prior art and the present invention.
CDMA Code-Division Multiple Access
FIR Finite Impulse Response
HSPA High-Speed Packet Access
QAM Quadrature Amplitude Modulation
UMTS Universal Mobile Telecommunications Service
WCDMA Wideband Code-Division Multiple Access In the 3rd Generation cellular system known as WCDMA or UMTS, there is currently a HSPA method under specification for transmitting higher data rates from a mobile phone to a network (or base station). The HSPA transmission uses an approach called "Multi-code CDMA". In this Multi-code CDMA system, each data symbol is spread out in time and spectrum by combining it with a spreading code. On the downlink (base station to mobile phone), the codes used to transmit signals from the base station are coordinated at the base station so that they are mutually orthogonal. In contrast, in the uplink (mobile phone to base station), the coordination needed between different mobile phones to achieve orthogonality is considered too difficult to implement, so each mobile phone uses a different random code sequence.

However, at each mobile phone, it is still possible to generate several random code sequences that are coordinated among themselves to be mutually orthogonal. Each of these orthogonal codes may then carry a symbol sub-stream so that the combined symbol stream rate is enhanced. But, in this situation, the mobile phone's available transmitter power is going to be divided between the different codes which means that the range over which each sub-stream may be successfully received and decoded error free is going to be reduced. In fact, the reduction of power per each sub-stream in a multi-code modulation signal transmitted from a mobile phone is worse than would be expected by merely dividing the transmitter power by the total number of sub-streams. This is because it is not so much the average power that is constrained by battery voltage, but rather the peak signal amplitude, which happens to be limited by the battery voltage.

Thus, in the 3rd Generation cellular system there is a desire for a modulation scheme which develops the greatest mean power per sub-stream within a constraint of the composite peak signal amplitude of all sub-streams. For example, if the mobile phone used a three-code multicode scheme with three length=4 codes where each code carries a sub-stream of 16 QAM symbols at similar amplitude, then the total mean power that is transmitted within a given peak amplitude constraint is 7.32 dB below the peak before filtering to contain the spectrum, and the mean power per sub-stream is 12.1 dB below the peak. Filtering generally increases the peak-to-rms ratio further. The HSPA standard describes an improvement over the three length=4 spreading code scheme since it specifies a length=2 code of twice the power ($\sqrt{2}$ times the amplitude) which carries two symbols in the same time period that a superimposed and orthogonal length=4 code carries a third symbol, which effectively achieves the same symbol rate as three length=4 codes. This 4+(2,2) configuration is able to develop a total mean power which is 5.44 dB below the peak, and is 1.88 dB more effective than the 4+4+4 configuration associated with the three length=4 spreading code scheme. Although the 4+(2,2) configuration works well, it is still desirable for the mobile phone to be able to further reduce the ratio of the peak to mean power when transmitting multi-code modulation signals. This need and other needs are addressed by a transmitter and a method of the present invention.

SUMMARY

In one aspect, the present invention provides a transmitter that is able to transmit data using multiple codes of a spread-spectrum signal encoding scheme by employing a bit grouper that accepts a block of input bits, divides the block of input bits into a number of subgroups where each subgroup is associated with one or other of two axes in a complex plane and with a code of the multiple codes, and routes the subgroups of bits to chip value generator devices (e.g., look-up tables, real-time computing devices). The chip value generator devices generate an I-signal value and a Q-signal value, each of the I and Q signal values are determined by: (1) bit to symbol mapping that associates a numerical signal value with each possible pattern of bits in a subgroup; (2) axis rotation for multiplying any pair of the numerical signal values by a multi-dimensional rotation matrix (e.g., 2×2 rotation matrix) to generate a rotated pair of signal values; and (3) addition to add rotated and/or non-rotated numerical signal values corresponding to the same axis to generate the I-signal and Q-signal values respectively, where the I and Q signal values having reduced peak-to-rms ratio when compared to the I and Q signals values with an axis rotation of zero degrees.

In another aspect, the present invention provides a method for generating a radio signal with a reduced peak-to-rms ratio using multiple access codes to carry multiple, multi-bit data symbols. In one embodiment, the method includes the steps of: (a) determining a number of the multiple access codes to carry the data symbols; (b) dividing a group of bits into a number of subgroups that are less or equal to twice the number of the multiple access codes; (c) using each subgroup of bits to select one of a number of In-phase or Quadrature signal values, where at least one pair of said selected signal values had been modified by performing an axis rotation in a plane of the selected pair of signal values to obtain rotated signal values; (d) multiplying each access code with a complex signal value including one of the In-phase values and one of the Quadrature values or of one of the rotated In-phase values and one of the rotated Quadrature values to obtain a set of modulated chips for each access code; and (e) adding corresponding chips of each access code to obtain a multicode signal wherein the peak-to-rms ratio is reduced as compared to a radio signal that does not have axis rotations.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

The present invention includes a mobile phone transmitter and a method that implement a modulation scheme which develops a desirable mean power per sub-stream within a constraint of the composite peak signal amplitude of all sub-streams. In one embodiment, the transmitter transmits a signal that comprises the linear sum of N CDMA spreading codes, the codes being multiplied by respective complex signal values that depend on complex data symbols such as 16 QAM symbols. The real and imaginary parts of these codes after the complex signal multiplication constitute dimensions in a multidimensional signal space which have two dimensions per code. A pair of dimensions may have been selected to form a plane and then the signal space may have been rotated in any such plane before the complex data symbols are mapped to the signal space such that the resulting composite signal peak to rms amplitude ratio after applying data symbol modulation is reduced. To help describe the present invention, a detailed description about the aforementioned traditional three-code multicode scheme which has the 4+4+4 configuration and the aforementioned traditional HSPA three-code multicode scheme which has the 4+(2,2) configuration is provided first with respect to FIGS. 1-4 and then a detailed discussion about the present invention is provided after that with respect to FIGS. 5-7.

Figure 1:
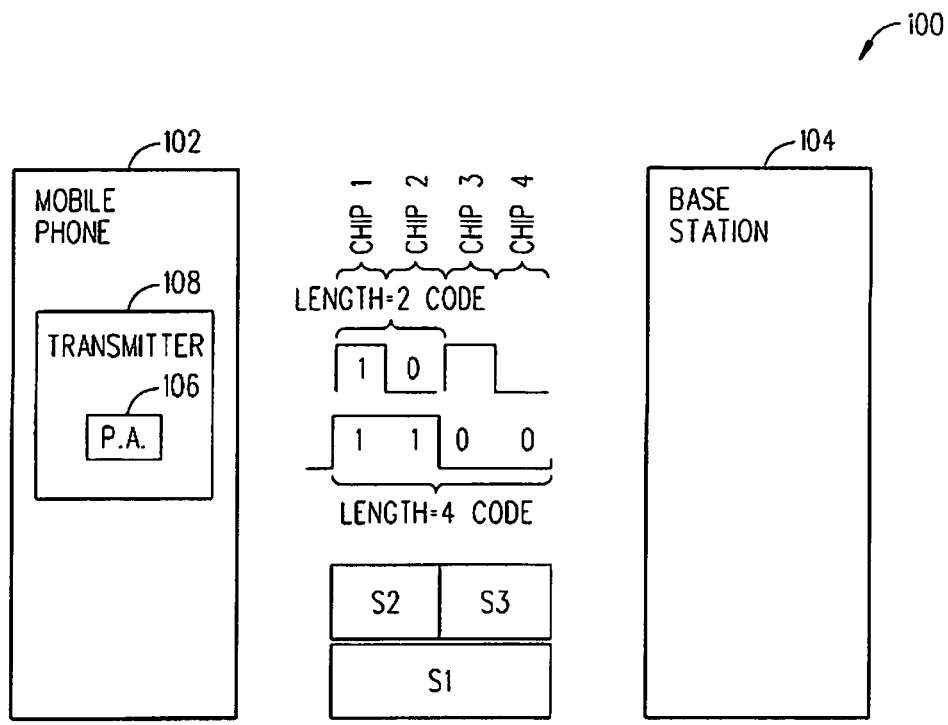
FIG. 1 is a diagram of a traditional HSPA 4+(2,2) multi-code cellular system which is used to help explain the present invention.

Referring to FIG. 1, there is a block diagram of a traditional HSPA three-code multicode cellular system 100 where a mobile phone 102 has a transmitter 108 that transmits a radio signal with three 16 QAM symbols S1, S2 and S3 per each 4-chip modulation period to a base station 104. As shown, a length=2 code is repeated twice and used to carry two 16 QAM symbols S2 and S2 successively, while a length=4 code, orthogonal to the length=2 code is additively superimposed and used to carry a third 16 QAM symbol S1 during the same 4-chip period. A 16 QAM symbol constellation has the general form shown in FIG. 2. Each symbol S1, S2 and S3 has 4 bits so with three symbols S, S2 and S3 there are 12 bits conveyed in the 4-chip time interval, representing 4096 possibilities. Thus, the decoding at the base station 104 can include testing all 4096 possibilities (the "brute force" method") or may use the reduced complexity method disclosed in co-assigned U.S. patent application Ser. No. 12/035, 970 filed Feb. 22, 2008 and entitled "Efficient Multicode Detection", the contents of which are incorporated by reference herein.

Figure 2:
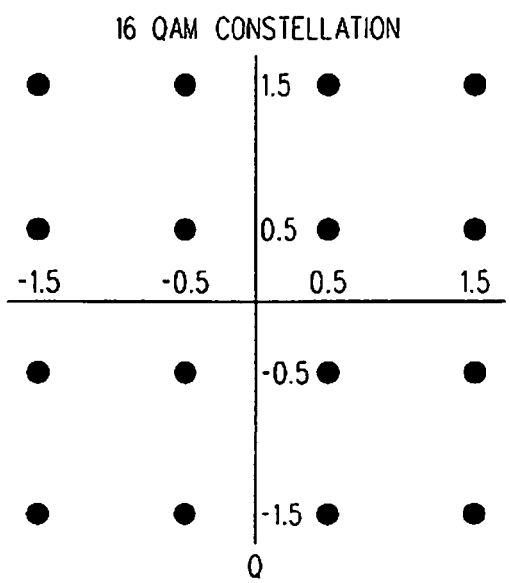
FIG. 2 is a diagram showing the 16 points of a 16 QAM constellation which is used to help explain the present invention.

Communicating using 16 QAM symbols comprises transmitting 2 bits on each of the I and Q components of a signal, the bits being equispaced about zero in each of the two dimensions of the complex signal plane. Thus, the I-component may take on values of +1.5, +0.5, −0.5 and −1.5 while the Q-component does likewise independently. FIG. 2 shows the 16 possible signal points which are located in the I, Q plane at the intersections of a regular, rectangular grid. The peak-to-rms ratio of a single 16 QAM symbol may be calculated by determining the peak amplitude and the root-mean-square value. The peak amplitude occurs when both I and Q take on their maximum amplitude of ±1.5 at the same time, giving a net vector length of $1.5\sqrt{2}$, whereas the root-mean-square value is calculated by averaging the square of the amplitude over all 16 points. There are 4 corner points each with a square amplitude value $(1.5\sqrt{2})^2 = 4.5$, 8 points on the sides each of square amplitude $(1.5^2 + 0.5^2) = 2.5$, and four points in the middle of square amplitude $(0.5\sqrt{2})^2 = 0.5$. The average of these points is $(4 \times 4.5 + 8 \times 2.5 + 4 \times 0.5)/16 = 2.5$. Thus, the rms value is $\sqrt{2.5}$ or 1.58. The peak-to-rms amplitude ratio is thus $1.5\sqrt{2}/\sqrt{2.5}$, which in decibels is 2.55 dB.

For the modulation of FIG. 1 however, it can be seen that two I values and two Q values are going to overlap in each chip period. The I-value of the length=4 code may be one of the four values 1.5, 0.5, −0.5, −1.5, but the I-values of the length=2 code are $\sqrt{2}$ times larger. The Q-values are scaled likewise. Thus, applying the same procedure as above to calculate peak-to-rms ratio gives the answer 5.44 dB for this type of multi-code modulation as mentioned in the background section. If on the other hand, the three length=4 codes of the traditional 4+4+4 configuration shown in FIG. 3 had been used then the I-values for each would have been any of the values 1.5, 0.5, −0.5 or 1.5, giving a peak I-value of 4.5 and a peak Q-value likewise, or a peak amplitude of I and Q combined of $4.5\sqrt{2}$. The rms value however is just $\sqrt{3}$ times the rms value of a single 16 QAM transmission which was calculated above to be $\sqrt{2.5}$. Thus, the peak-to-rms ratio of three length=4 codes superimposed is $4.5\sqrt{2}/(\sqrt{3} \times \sqrt{2.5}) = 2.32$ or 7.32 dB, as mentioned in the background section. Therefore, when peak amplitude is limited, the 4÷(2,2) configuration of FIG. 1 is preferable to the 4+4+4 code congfiguration of FIG. 3.

The mobile phone's transmitter 108 has a power amplifier 106 that generates a mean power output without distortion that depends on the peak-to-rms ratio of the signal in addition to other factors. For a class-B power amplifier 106, the maximum non-distorting efficiency occurs when it happens to be generating maximum power, where the maximum efficiency is defined as follows:

$$\eta_{max} = \frac{\text{Peak power output}}{\text{Maximum DC power consumption}} \quad (1a)$$

and when normalized to unity load resistance the maximum efficiency can be defined as follows:

$$\eta_{max} = \frac{(\text{Peak amplitude})^2}{\text{Maximum DC power consumption}} \quad (1b)$$

On the other hand, the mean efficiency with a varying amplitude signal is defined as follows:

$$\eta = \frac{\text{Mean power output}}{\text{Mean DC power consumption}} \quad (2a)$$

$$= \frac{(r.m.s \text{ amplitude})^2}{\text{Mean DC power consumption}} \quad (2b)$$

$$= \frac{(\text{Peak amplitude/Peak-to-rms ratio})^2}{\text{Mean DC power consumption}} \quad (2c)$$

Also, the power consumption of a class-B power amplifier 106 with zero quiescent bias happens to be proportional to the output signal amplitude. Therefore, the mean DC power consumption is equal to the peak power consumption times the ratio of mean amplitude to peak amplitude, which, normalized to unity load resistance, gives the following:

$$\text{Mean DC }pwr.\text{ consumption} = \frac{\text{mean amplitude} \times (\text{peak amplitude})^2}{\text{peak amplitude}} \quad (3a)$$

$$= \text{peak amplitude} \times \text{mean amplitude} \quad (3b)$$

Combining the equations 1b, 2c and 3b results in the following:

$$\eta = \eta_{max}/(\text{peak-to-rms ratio} \times \text{mean-to-rms ratio}) \quad (4)$$

While $\eta_{max}$ is a power amplifier implementation-dependent quantity, which one may assume the designer had already maximized; the value (peak-to-rms amplitude ratio× mean-to-rms amplitude ratio) is however a characteristic of the modulation. Therefore, to take maximum advantage of the available power amplifier efficiency, one would like to minimize the latter quantity.

Figure 3:
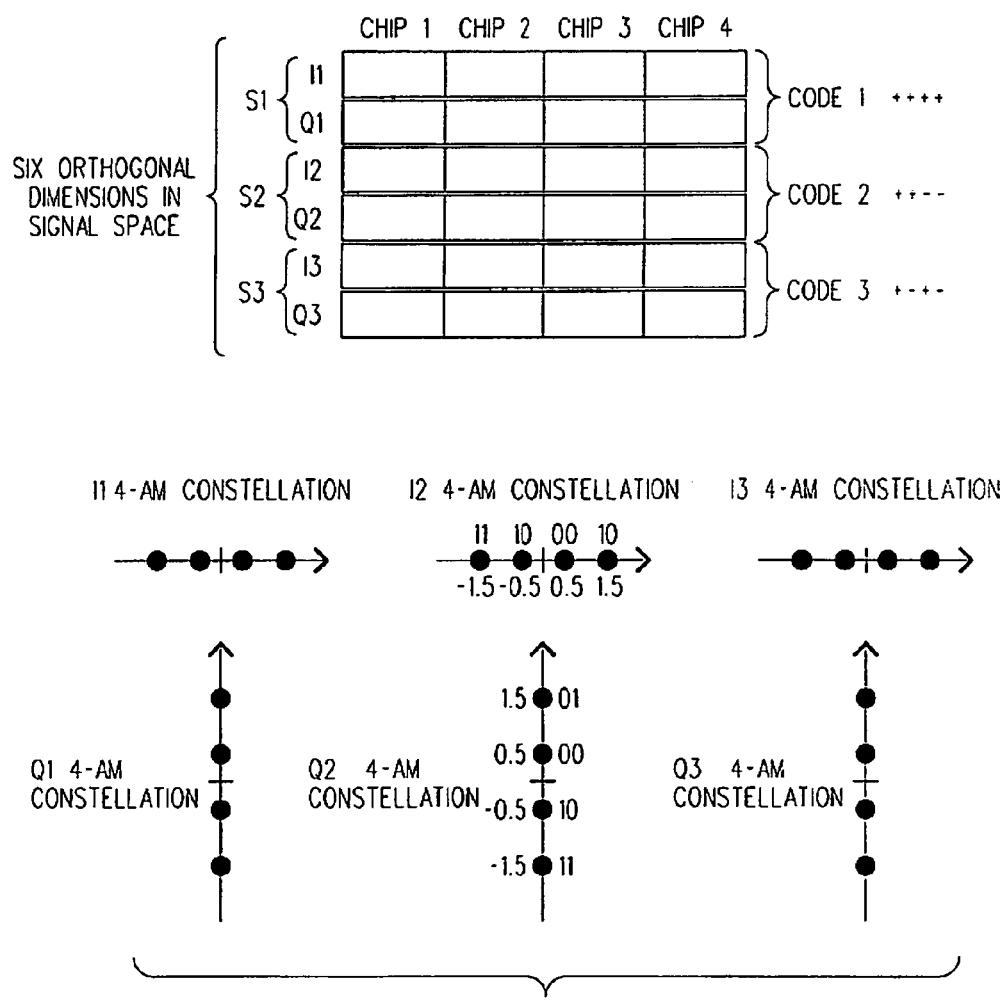
FIG. 3 are diagrams associated with a traditional 4+4+4 multicode cellular system which is used to help explain the present invention.

Referring again to the three-code multicode scheme shown in FIG. 3, it can be seen that three 16 QAM symbols S1, S2 and S3 can be regarded as six 4-AM symbols, each 4-AM symbol carrying two bits of information with its four possible signal points, and occupying one of six dimensions I1, Q1, I2, Q2, I3 and Q3. As shown, the pairs of (I,Q) dimensions are orthogonal by virtue of being 90 degrees out of phase, while the use of orthogonal codes allows three such pairs of I,Q values to be conveyed using all six dimensions I1, Q1, I2, Q2, I3 and Q3, which are orthogonal to each other when the codes are mutually orthogonal. Absent signal distortion in the transmission, the six dimensions I1, Q1, I2, Q2, I3 and Q3 are truly independent inasmuch as they do not interfere with one another, and the receiver noise has a nominal and equal rms value that is uncorrelated between any one of the dimensions I1, Q1, I2, Q2, I3 or Q3 and any other one of those dimensions. However, the six dimensions I1, Q1, I2, Q2, I3 and Q3 are not independent as far as the mobile phone's transmitter 108 is concerned, as the values I1, I2, I3 and likewise the values Q1, Q2, Q3 add linearly and not quadratically. Thus, the instantaneous transmitted signal amplitudes are as shown in the table below (see code 1, code 2 and code 3 in FIG. 3):

| | Chip 1 | Chip 2 | Chip 3 | Chip 4 |
|---|---|---|---|---|
| $I_{transmit} =$ | I1 + I2 + I3 | I1 + I2 − I3 | I1 − I2 + I3 | I1 − I2 − I3 |
| $Q_{transmit} =$ | Q1 + Q2 + Q3 | Q1 + Q2 − Q3 | Q1 − Q2 + Q3 | Q1 − Q2 − Q3 | and the transmit signal amplitude is $(I^2 \text{ transmit} + Q^2 \text{ transmit})^{0.5}$ The above shows that, since all sign combinations of I1, I2 and I3 are tested across the four chips, whatever their individual signs are, they will constructively add in one or other chip to produce the peak value in that chip. Unless otherwise constrained, the worst case for transmit signal amplitude is when the peak of I and the peak of Q happen to occur in the same chip.

If the I and Q signals are of the same form, then it follows that the peak-to-rms ratio of the transmit amplitude is the same as the peak-to-rms ratio of I or Q alone where the combination of I and Q merely increases both the peak and the rms by √2 alike relative to I or Q alone. Therefore, seeking a modulation scheme with a low peak-to-rms ratio on I and Q alone can produce a low peak-to-rms for the combined transmit signal.

Figure 4:
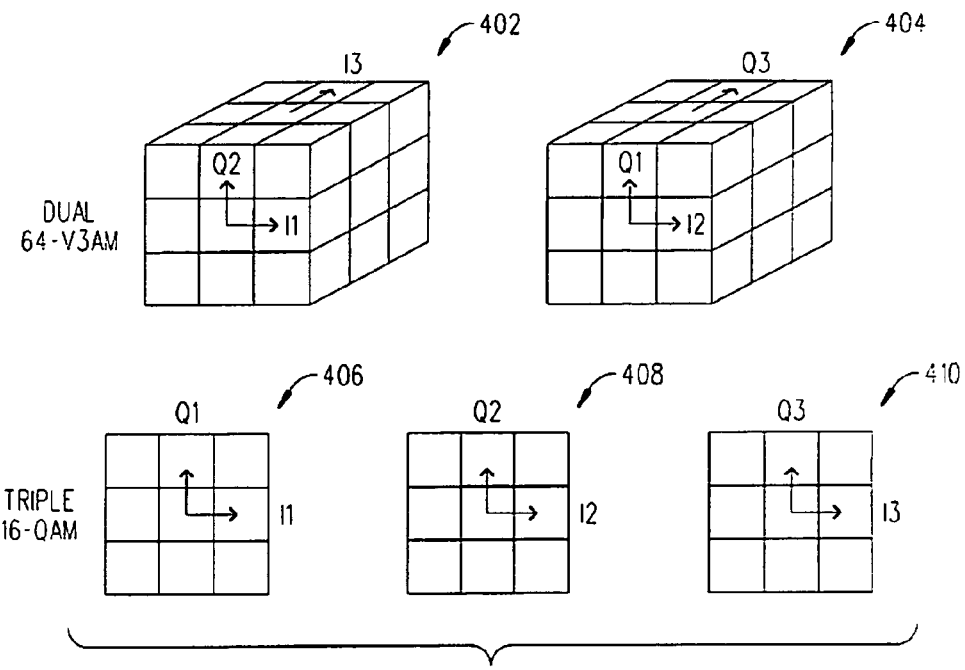
FIG. 4 are diagrams illustrating different ways six dimensions I1, Q1, I2, Q2, I3 and Q3 can be grouped to form multi-dimensional symbols which are used to help explain the present invention.

Referring to FIG. 4, the diagrams show that the six dimensions I1, Q1, I2, Q2, I3 and Q3 can be grouped to form two three-dimensional symbols 402 and 404. These three-dimensional symbols 402 and 404 are cubic when the modulation is 4-AM in each of the three axes. If fact, the six dimensions I1, Q1, I2, Q2, I3 and Q3 can be conceptually grouped in any desired way, for example, as six 4-AM symbols (FIG. 3), as three 16 QAM symbols 406, 408 and 410 (FIG. 4), or as the aforementioned two 3-D symbols 402 and 404 for which the nomenclature V3AM is used, to mean Amplitude Modulation along each axis of a 3-dimensional space (a V3). In principle, the six dimensions I1, Q1, I2, Q2, I3 and Q3 could alternatively be grouped as one V4AM symbol and one QAM symbol. Thus, when the number of points along each of three axes is 4, then the total number of points in a 3-D symbol is $4^3 = 64$, so the notation 64-V3AM can be used. Likewise, four points along each dimension of a V4 would produce a 256-V4AM, and five points along each dimension of a V5 could produce a 1024-V5AM, and six points along each dimension of a V6 could produce a 4096-V6AM.

Regarding the modulation as spanning more than two dimensions, such as the cubic constellations 402 and 404 of FIG. 4, indicates that the constellations may be rotated in planes other than the I,Q or phase plane. For example, a constellation could be rotated in an I,I plane or a Q,Q plane, such as the plane formed by I1 and I2. A computer trial of different rotations of the cubic constellations 402 and 404 of FIG. 4 showed a reduction in peak-to-rms ratio from 7.32 dB of standard triple 16 QAM using three length=4 codes to 5.44 dB when one symbol was rotated 45 degrees in the I1,I3 plane and the other symbol was rotated 45 degrees in the Q1,Q3 plane. What this means, is that instead of applying symbol 1 to code 1 and symbol 3 to code 3 as in the past, the codes in one embodiment of the present invention receive modulation from a 45-degree rotated symbol pair as follows:

$$[\cos(45) -\sin(45)](I1+jQ1)=(I1-I3)/\sqrt{2}+j(Q1+Q3)/\sqrt{2}$$

$$[\sin(45) \cos(45)](I3+jQ3)=(I1+I3)/\sqrt{2}+j(Q1+Q3)/\sqrt{2}$$

As can be seen, the codes are respectively modulated with the sum and difference of the two symbols which are scaled by $1/\sqrt{2}$. The rotation matrix would result in other scaling if the rotation were other than through 45 degrees.

Now consider that codes 1 and 3 are the length=4 orthogonal patterns as follows:

|          | Chip1 | Chip2 | Chip3 | Chip4 |
|----------|-------|-------|-------|-------|
| code 1 = | 1     | 1     | −1    | −1    |
| and code 3 = | 1 | −1    | 1     | −1    | and compute each chip as a function of the symbols $S1=I1+jQ1$ and $S3=I3+jQ3$, obtaining:

|              | Chip 1 | Chip 2 | Chip3 | Chip 4 |
|--------------|--------|--------|-------|--------|
| $\sqrt{2}\times$ | S1  | −S3    | S3    | −S1    |

It can be seen that the result is that the symbols S1 and S3 are each repeated twice with a sign change, but in an interleaved order S1,S3,S3,S1.

Other orthogonal code pairs produce similar but different results, as shown below:

|          | Chip1 | Chip2 | Chip3 | Chip4 |
|----------|-------|-------|-------|-------|
| code 1 = | 1     | −1    | −1    | 1     |
| code 3 = | 1     | 1     | 1     | 1     |
| $\sqrt{2}\times$ | S1 | S3 | S3 | S1 |
| code 1 = | 1     | −1    | 1     | −1    |
| code 3 = | 1     | 1     | 1     | 1     |
| $\sqrt{2}\times$ | S1 | S3 | S1 | S3 |
| code 1 = | 1     | −1    | −1    | 1     |
| code 3 = | 1     | −1    | 1     | −1    |
| $\sqrt{2}\times$ | S1 | −S1 | S3 | −S3 |
| code 1 = | 1     | 1     | −1    | −1    |
| code 3 = | 1     | 1     | 1     | 1     |
| $\sqrt{2}\times$ | S1 | S1 | S3 | S3 |

The latter two examples conform with the current HSPA standard which specifies that two symbols shall be transmitted sequentially with a length=2 spreading code while a third symbol is transmitted using an orthogonal length=4 spreading code in the same period (see FIG. 1). In the two latter examples, the length=2 spreading code would be 1, −1 in one case and 1, 1 in the second case, which are the only two possibilities. The length=4 codes would then be one of 1, −1, −1, −1 and 1, −1, 1, −1 in the first case or one of 1, 1, −1, −1 and 1, 1, 1, 1 in the second case. Thus, the present invention is capable of reproducing the current HSPA modulation which transmits two symbols on a length=2 code and one symbol on a length=4 code, by using three length=4 spreading codes and applying a 45-degree axis rotation in a plane defined by two real axes and a plane defined by two imaginary axes. However, the present invention is also capable of producing modulations which the current HSPA specification cannot and has not envisioned, as shown in the first three examples. In addition, the peak-to-rms amplitude ratio produced by the above 45-degree axis rotations in the length=4 code, triple-16 QAM case was reduced, before filtering, from 7.32 dB to 5.44 dB.

It was also investigated how the rotation in any plane composed of an I-axis and a Q-axis affected the peak-to-rms ratio. In order to retain orthogonality after rotation, it is preferred to select the I and Q axes which belong to the same code. A computer search revealed that the peak-to-rms ratio is reduced from 7.32 dB without axis rotation to 6.51 dB when the second 16 QAM symbol is rotated 30 degrees in its I, Q plane relative to the first and the third symbol is rotated 60 degrees in its I,Q plane. Thus, evenly staggering the phase angles of the 16 QAM symbols reduces the peak-to-rms ratio, in this particular example, by 0.81 dB.

Both types of axis rotation may now be applied, as follows:
(1) a 45 degree rotation in the I, I and Q, Q planes involving two of the symbols, and
(2) a rotation in the plane of the remaining pair of I, Q axes involving the remaining symbol of the three 16 QAM symbols.

The results are summarized in TABLE 1 below:

TABLE 1

| Case No. | PEAK/RMS | P.A. Efficiency Factor |
|----------|----------|------------------------|
| 1        | 7.32 dB  | −3.20 68               |
| 2        | 6.51 dB  | −2.80 dB               |
| 3        | 5.44 dB  | −2.32 dB               |
| 4        | 4.77 dB  | −1.99 dB               | where:
Case No. 1 is triple 16 QAM using three, length=4 codes;
Case No. 2 is triple 16 QAM using three, length=4 codes with a progressive phase rotation of 30 degrees between the three 16 QAM symbols;
Case No. 3 is triple 16 QAM using three length=4 codes with a 45-degree rotation in the II plane of two of the symbols and a 45-degree rotation in the QQ plane of the same two symbols; and
Case No. 4 is as Case No. 3 with an additional 45-degree rotation in the I,Q (phase) plane of the third symbol.
Note: Although 16 QAM was used in the above examples, if desired QAM constellations of other sizes could be used, for example 64 QAM.

To assist the base station s receiver to decode mobile transmissions, the mobile phones which conform to the WCDMA standard transmit a known pilot code that is superimposed on other data-bearing codes. The pilot code is used by the base station's receiver to establish a phase reference, and to characterize the multi-path channel to facilitate the decoding of the unknown symbols. For instance, triple 16 QAM uses ¾ of the total available orthogonal code space (i.e. three out of four, length=4 codes), and the pilot transmission uses the remaining ¼ of the code space. There is a trade-off between the quality of the channel reference provided by the pilot code, and the amount of energy it uses which would otherwise have been used in the data-bearing codes. This compromise results in the pilot code being transmitted at a level of about −12 dB relative to the length=4 code symbol, and this pilot code is designated in the WCDMA standard as the E-DPCCH channel. The effect on the peak-to-rms ratio of including the pilot code on another orthogonal code is shown in TABLE 2 below:

TABLE 2

| Case No. | PEAK/RMS | P.A. Efficiency Factor |
|---|---|---|
| 1 | 7.61 dB | −3.34 dB |
| 2 | 6.97 dB | −3.03 dB |
| 3 | 5.81 dB | −2.50 dB |
| 4 | 5.29 dB | −2.24 dB |

For completeness, TABLES 3 and 4 below show the calculated performances after root-raised cosine filtering, with and without a pilot code. In each case, the pilot code is in phase (or quadrature) with the first 16 QAM symbol, which is modulated to a length=4 code. The root-raised cosine roll-off factor a is equal to 0.22, as specified for the UMTS (WCDMA) wireless system.

TABLE 3

(w/out pilot code)

| Case No. | PEAK/RMS | P.A. Efficiency Factor |
|---|---|---|
| 1 | 8.74 dB | −3.91 dB |
| 2 | 8.02 dB | −3.55 dB |
| 3 | 7.32 dB | −3.27 dB |
| 4 | 6.67 dB | −2.94 dB |

TABLE 4

(with pilot code)

| Case No. | PEAK/RMS | P.A. Efficiency Factor |
|---|---|---|
| 1 | 8.96 dB | −4.01 dB |
| 2 | 8.27 dB | −3.67 dB |
| 3 | 7.60 dB | −3.40 dB |
| 4 | 7.07 dB | −3.14 dB |

TABLES 3 and 4 confirm that the proposed 45-degree axis rotations still achieve approximately the same reduction in peak-to-rms ratio after filtering and with or without addition of the pilot code. The best phase of the pilot code was found to be when it was aligned with the I or Q axis of a length=4 code symbol, and this phase was used in all of the above case nos. 1-4.

Figure 5:
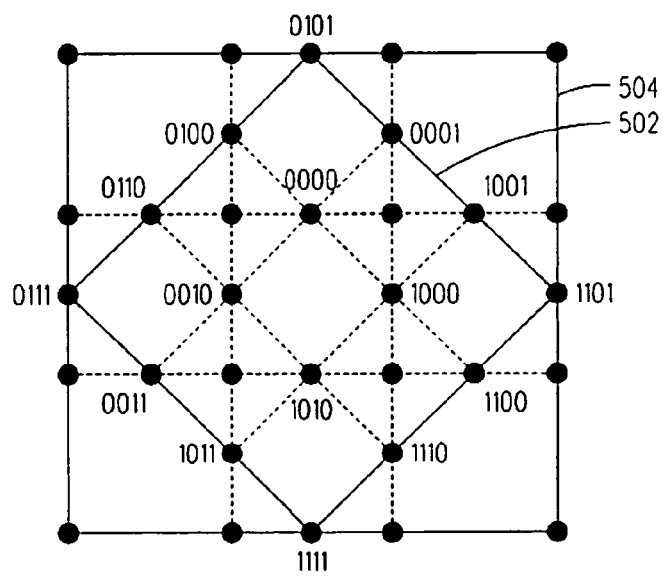
FIG. 5 is a diagram that visually depicts a 45 degree phase rotation of 16 QAM symbols modulated on to a length=4 code relative to 16 QAM symbols modulated on to a length=2 code of double the power ($\sqrt{2}$ times the amplitude) which is used to help explain the present invention.

Referring to FIG. 5, there is a diagram that visually depicts the 45 degree phase rotation of 16 QAM symbols 502 modulated on to a length=4 code relative to 16 QAM symbols 504 modulated on to a length=2 code of double the power ($\sqrt{2}$ times the amplitude). Due to the scaling and rotation, the smaller constellation 502 is seen to fit exactly inside the larger constellation 504. It can be seen that the I value or Q value contribution from the smaller, 45-degree rotated code can be one of only seven values. This particular feature can be used to reduce a look-up table based transmit signal generator, as is described in detail further below with respect to FIG. 6.

Figure 6:
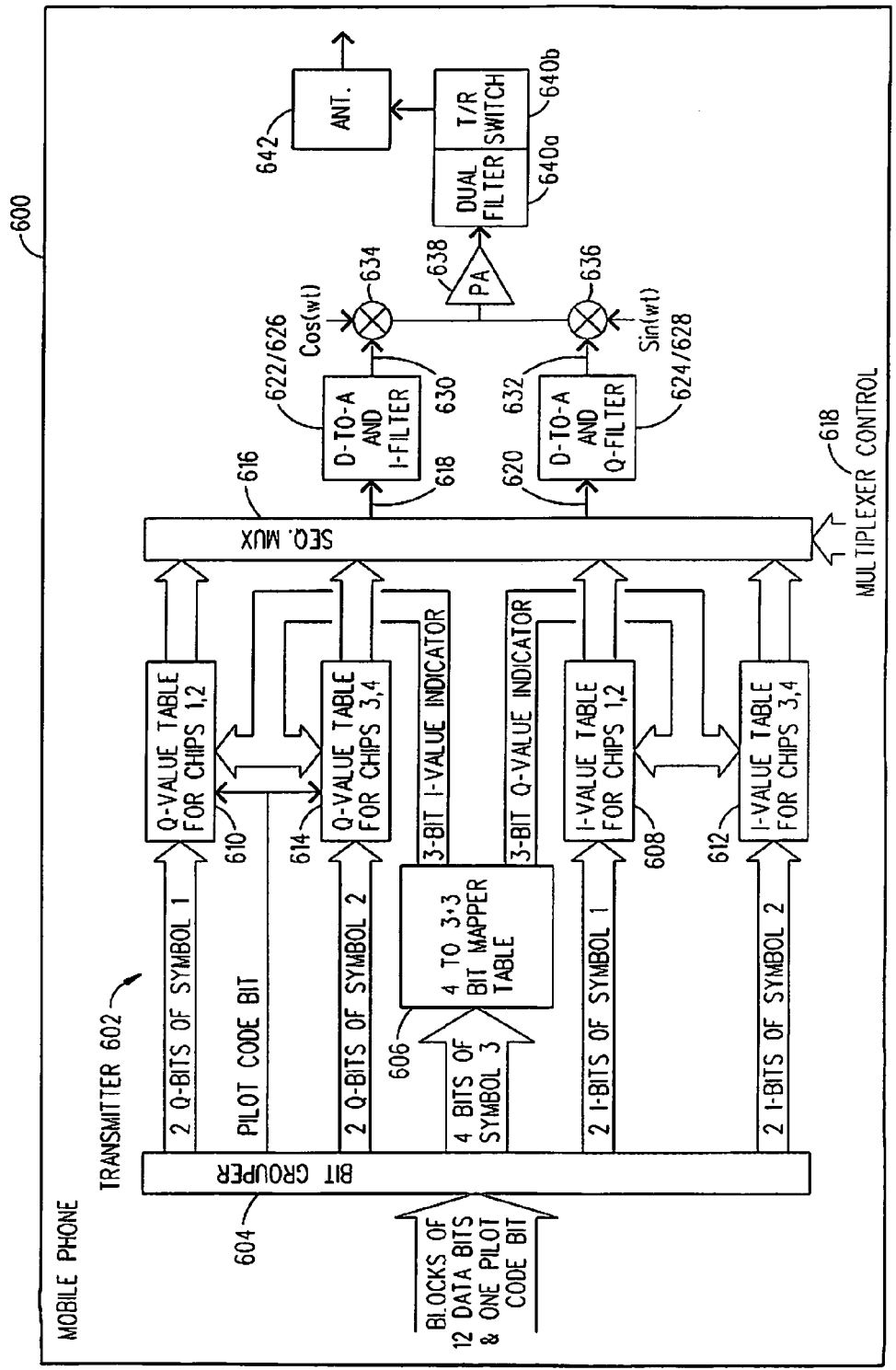
FIG. 6 is a block diagram of a mobile phone with a transmitter configured in accordance with an embodiment of the present invention.

Referring to FIG. 6, there is shown a mobile phone 600 with a transmitter 602 which uses triple-16 QAM signals in a manner that conforms to the above teachings in accordance with one embodiment of the present invention. Note that only the transmitter's components and functions which are relevant to the present invention have been described herein. Since, in each code interval, 12 bits are communicated, thus each chip value can only take on one of 4096 values. In fact, each chip's real value or imaginary value may depend on fewer than 12 bits, and thus may only be able to take on less than 4096 values. If the pilot code is taken into account, and it is only one binary bit transmitted on only the I or Q channel, then the real or the imaginary value may depend on a maximum of 13 bits which means it may take on one of no more than 8192, but probably fewer, values. In any case, these values are sufficiently few such that they are capable of being stored in a relatively small memory by today's standards, for example, a memory of 4096 or 8192 values for each of the four chips, where the contents of the memory determine the nature of the coding and the axis rotations employed.

In this example, the I value of two chips depends on two bits of a first 16 QAM symbol and all four bits of a third symbol, due to it being rotated 45 degrees such that both its two real bits and its two imaginary bits affect the I value of the two chips. However, with reference to FIG. 5, it can be seen that the contribution from the rotated symbol to the I-value or the Q value of a chip can take on only one of seven distinct values, not 16, so the four bits of the symbol can first be reduced to a first group of 3 bits that indicate one of seven values for the I-contribution and second group of three bits that indicate one of seven values for the Q-contribution. This reduction from 4 to 3+3 can be made by a small look up table or by a few logic gates to implement a truth table that can be deduced from the smaller constellation 502 in FIG. 5.

Thus, in this example the transmitter 602 has a bit grouper 604 which is configured to receive blocks of 12 data bits plus one pilot code bit. The bit grouper 604 selects the bits corresponding to the two axes of the three intended 16 QAM symbols and routes the bits to the correct look-up tables 606, 608, 610, 612 and 614. In particular, the bit grouper 604 routes all 4 bits of symbol 3 to the bit-mapper table 606 which produces three I-indicator bits and three Q-indicator bits. The three Q-indicator bits together with the two I bits of the first symbol then address a 32-value look-up table 608 (actually only 28 entries are used) to obtain a chip I-value that will be subsequently transmitted. Similarly, the three I-indicator bits together with the other two Q bits of the first symbol and the pilot code bit address a 64-value look-up table 610 (of which only 56 entries are actually used) to obtain a chip Q-value that will be subsequently transmitted. It saves time if the look-up tables 608 and 610 actually deliver the I and Q values for both chips 1 and 2 which depend on the bits of the first symbol. For example, the I value of a first chip 1 may be a one-byte value packed into a 16-bit word along with the I value of a second chip 2, and likewise for the Q-values. Thus, the I and Q tables 608 and 610 would be of size 28 times 16-bits and 56 times 16-bits, respectively.

The other two chips 3 and 4 in a 4-chip period depend on the same four bits of the third symbol and on the two bits which belong to a second symbol rather than the first symbol. As described above, the bit grouper 604 routes all 4 bits of symbol 3 to the bit-mapper table 606 which produced the three I-indicator bits and the three Q-indicator bits. The three Q-indicator bits together with the two I bits of the second symbol then address a 32-value look-up table 612 (actually only 28 entries are used) to obtain I-values for chips 3 and 4 that will be subsequently transmitted. Similarly, the three I-indicator bits together with the other two Q bits of the second symbol and the pilot code bit address a 64-value look-up table 614 (of which only 56 entries are actually used) to obtain Q-values for chips 3 and 4 that will be subsequently transmitted. In this example, the look-up tables 606, 608 610, 612 and 614 would have been pre-computed according to the selected CDMA multiple access code patterns.

The outputs from the look-up tables 608, 610, 612 and 614 are input to a sequential multiplexer 616 where the I and Q values for chips 1, 2, 3 and 4 are then selected sequentially to have an order that is determined by a multiplexer control signal input 618. The multiplexer control signal 618 determines whether the I,Q values for chips 1, 2, 3, 4 are output in the order 1, 2, 3, 4 or 1, 3, 2, 4 or 1, 3, 4, 2 which was shown above to depend on the exact selection of the CDMA codes and their assignment to symbols. Thus in one mode, in which the order is 1, 2, 3, 4, and the look-up tables 606, 608, 610, 612 and 614 are pre-computed to omit the 45-degree relative phase rotation of symbol 3, the transmitter 602 is able to generate the triple-16 QAM modulation specified for the current HSPA uplink standard. However, the transmitter 602 is also able to output chips in an order that is not specified in the current HSPA uplink standard, and can generate signals with reduced peak-to-rms ratio by employing 45-degree rotations (or other types of rotations) which are pre-computed and stored in the look-up tables 606, 608, 610, 612 and 614.

The sequential multiplexer 616 has two outputs 618 and 620 which are respectively provided to two Digital-to-Analog convertors 622 and 624 and two reconstruction filters 626 and 628 to obtain continuous time I and Q analog modulating signals 630 and 632. The reconstruction filters 626 and 628 may be part FIR filters in the digital domain and part analog filters in the analog domain, and jointly implement the desired filtering, which, in the case of the UMTS/WCDMA system, is root-raised-cosine (root Nyquist) filtering with a roll-off factor a equal to 0.22. Quadrature modulators 634 and 636 receive the continuous-time I and Q analog signals 630 and 632 and respectively modulate them with cosine and sine carriers that are at the desired center frequency w. The outputs of the quadrature modulators 634 and 636 are amplified to a transmit level by a power amplifier 638 and then fed through a duplexing filter 640a for simultaneous transmit and receive modes, or alternatively through a T/R switch 640b if the system employs only time-division-duplex (ping-pong) modes before being transmitted by an antenna 642.

Thus, the transmitter 602 is able to transmit data using multiple codes of a spread-spectrum signal encoding scheme by employing a bit grouper 602 that accepts a block of input bits, divides the block of input bits into a number of subgroups where each subgroup is associated with one or other of two axes in a complex plane and with a code of the multiple codes, and routes the subgroups of bits to chip value generator devices (e.g., look-up tables, real-time computing devices). The chip value generator devices generate an I-signal value and a Q-signal value, each of the I and Q signal values being determined by: (1) bit to symbol mapping that associates a numerical signal value with each possible pattern of bits in a subgroup; (2) axis rotation for multiplying any pair of the numerical signal values by a multi-dimensional rotation matrix (e.g., 2×2 rotation matrix) to generate a rotated pair of signal values; and (3) addition to add rotated and/or non-rotated numerical signal values corresponding to the same axis to generate the I-signal and Q-signal output values respectively, where the I and Q signal values having reduced peak-to-rms ratio when compared to the I and Q signal values with an axis rotation of zero degrees.

It should be appreciated that the operations in steps (1), (2) and (3) do not need to be performed in real time, but represent a mathematical definition of how to determine the I and Q values used by the invention to represent 12 data bits. As has been described above, a transmitter may use the above mathematical definitions to pre-compute a set of look-up tables for different values of the 12 data bits plus 1 pilot bit, and the look-up tables may be used to reduce real-time computation or power consumption of an apparatus embodying the present invention.

An embodiment of transmitter 602 has been described above as implementing the present invention by using look-up tables 606, 608, 610, 612 and 614 which is computationally efficient in real time. However, the transmitter 602 may also implement the present invention by using various alternative means such as by computing the output values I and Q in real time as a function of the 13 input bits. In either case, the transmitter 602 can transmit a signal that comprises the linear sum of N CDMA spreading codes, the codes being multiplied by respective complex signal values that depend on complex data symbols such as 16 QAM symbols. The real and imaginary parts of the codes after the complex signal multiplication constitute dimensions in a multidimensional signal space, having two dimensions per code. A pair of dimensions may have been selected to form a plane and then the signal space may have been rotated in any such plane before complex data symbols had been mapped to the signal space. In one implementation, one real and one imaginary axis is selected to form the plane, and a rotation of 45 degrees is applied such that the composite signal peak to rms amplitude ratio after applying data symbol modulation is reduced. In another implementation, two real axes are selected to form a first plane in which a 45-degree rotation is performed, and two imaginary axes selected to form a plane in which a second 45 degree rotation is performed, such that when 16 QAM symbols are mapped to the rotated signal space, a cellular wireless waveform is produced that has reduced peak-to-rms ratio. In yet another implementation, a 45-degree rotation is applied in both a real-imaginary plane and a real-real plane, to produce a lower peak-to-rms ratio signal.

Figure 7:
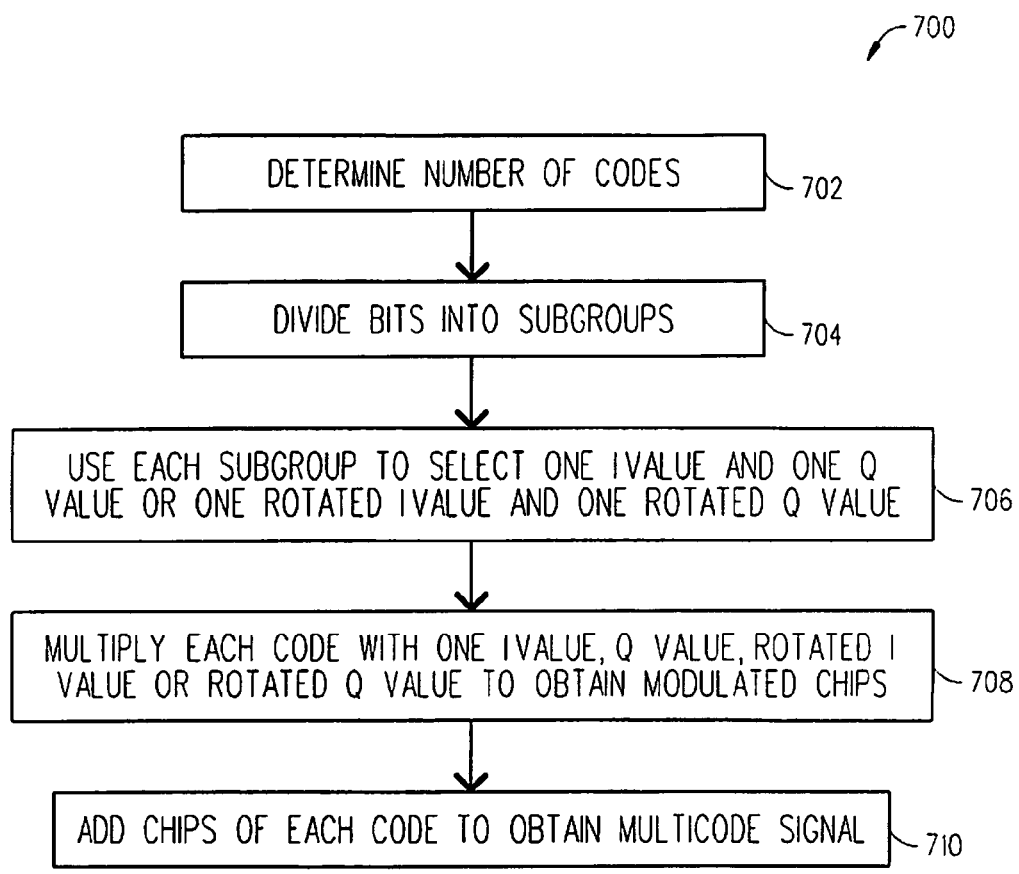
FIG. 7 is a flowchart illustrating the steps of a method for generating a radio signal with a reduced peak-to-rms ratio using multiple access codes to carry multiple, multi-bit data symbols in accordance with an embodiment of the present invention.

Referring to FIG. 7, there is a flowchart illustrating the preferred steps of a method 700 for generating a radio signal with a reduced peak-to-rms ratio using multiple access codes to carry multiple, multi-bit data symbols in accordance with the present invention. The method 700 comprises the steps of: (a) determining a number of the multiple access codes to carry the data symbols (step 702); (b) dividing a group of bits into a number of subgroups that are less or equal to twice the number of the multiple access codes (step 704); (c) using each subgroup of bits to select one of a number of In-phase or Quadrature signal values, where at least one pair of the In-phase or Quadrature signal values had been modified by performing an axis rotation in a plane of the pair of selected In-phase or Quadrature values to obtain rotated In-phase or Quadrature values (step 706); (d) multiplying each access code with one of the signal In-phase or Quadrature values or one of the rotated In-phase or Quadrature signal values to obtain a set of modulated chips for each access code (step 708); and (e) adding corresponding chips of each access code to obtain a multicode signal wherein the peak-to-rms ratio is reduced as compared to a radio signal that does not have the axis rotations (step 710).

From the foregoing, it has been shown that modulating data on to the real and imaginary parts of multiple, additively-superimposed CDMA codes can be regarded as modulating sub-groups of data bits on to the dimensions of a multi-dimensional signal space, and that the peak-to-rms ratio of the resulting composite signal can be advantageously reduced by applying axis rotations in planes defined by pairs of dimensions. The reduction of peak-to-rms ratio allows a peak-limited transmitter, such as a mobile phone transmitter, to deliver greater power output without excessive distortion and with higher efficiency, thus conserving battery life and increasing communications range or average data throughput rate.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the spirit of the invention as set forth and defined by the following claims.

What is claimed is:

1. A method for generating a radio signal in a transmitter with a reduced peak-to-rms ratio using multiple access codes to carry multiple, multi-bit data symbols, said method comprising the steps of:
   determining a number of the multiple access codes to carry the data symbols;
   dividing, by a bit grouper, a group of bits into a number of subgroups that is less or equal to twice the number of the multiple access codes;
   using each subgroup of bits to select, by a plurality of chip value generat devices, one of a number of In-phase or Quadrature signal values, where at least one pair of said selected signal values had been modified by performing an axis rotation in a plane of the selected pair of signal values to obtain rotated signal values;
   multiplying each access code with a complex signal value including one of said In-phase values and one of said Quadrature values or of one of said rotated In-phase values and one of said rotated Quadrature values to obtain a set of modulated chips for each access code; and
   adding corresponding chips of each access code to obtain a multicode signal.

2. The method of claim 1, wherein said selected at least one pair of signal values comprises a pair of In-phase values and a pair of Quadrature values.

3. The method of claim 2, wherein said axis rotation is a 45degree rotation in the plane of said pair of In-phase signal values and a 45 degree rotation in the plane of said pair of Quadrature signal values.

4. The method of claim 1, wherein said selected at least one pair of signal values comprises an In-phase signal value and a Quadrature signal value.

5. The method of claim 4, wherein said axis rotation is a 45degree rotation in the plane of said In-phase signal value and said Quadrature signal value.

6. The method of claim 1, wherein said selected at least one pair of signal values comprises all possible pairs of an In-phase signal value paired with a Quadrature value, and said axis rotation in the plane of a pair of values is through an angle that progressively increases for each pair of values.

7. The method of claim 6, wherein said progressive increase in angle is ninety degrees divided by the number of pairs of signal values.

8. The method of claim 1, wherein said codes are mutually orthogonal Code-Division Multiple Access, CDMA, access codes.

9. A transmitter comprising:
   a bit grouper that accepts a block of input bits and divides the block of input bits into a number of subgroups where each subgroup is associated with one or other of two axes in a complex plane and with one code from a plurality of codes;
   a plurality of chip value generator devices that receive the subgroups of bits from said bit grouper and generate an I-signal value and a Q-signal value, where each of the I and Q signal values are determined by:
      bit to symbol mapping that associates a numerical signal value with each possible pattern of bits in each of the subgroups;
      axis rotation for multiplying any pair of the numerical signal values by a multi-dimensional rotation matrix to generate a rotated pair of signal values; and
      addition to add the rotated signal values and the non-rotated signal values corresponding to the same axis to respectively generate the I-signal and Q-signal values, where the I and Q signal values have a reduced peak-to-rms ratio when compared to the I and Q signal values which have an axis rotation of zero degrees.

10. The transmitter of claim 9, further comprising:
   a plurality of Digital-to-Analog converters and filters that further process the I-signal and Q-signal values to generate continuous time signals with a desired spectral containment;
   a plurality of quadrature modulators that modulate the continuous time signals on to a cosine and sine carrier frequency wave; and
   a transmit power amplifier that amplifies the modulated cosine and sine carrier wave signal to a transmit power level.

11. The transmitter of claim 9, which is capable of operating in one mode using zero degrees axis rotation and in another mode using non-zero axis rotation for reduced peak-to-rms ratio.

12. The transmitter of claim 9, wherein said block of input bits comprises 12 data bits, the number of subgroups of bits is six, each containing two bits, the bit-to-symbol mapping associates relative numerical values to the four possible bit patterns 00,01,10 and 11 corresponding to four-level amplitude values of −3,−1, +1 and +3, and said axis rotation is 45 degrees in the plane of a pair of signal values derived from a pair of bit subgroups associated with two perpendicular axes of the complex plane of the same spread spectrum code.

13. The transmitter of claim 9, wherein the transmitter is incorporated in a mobile phone.

* * * * *

UNITED STATES PATENT AND TRADEMARK OFFICE
CERTIFICATE OF CORRECTION

PATENT NO. : 8,059,697 B2  
APPLICATION NO. : 12/166883  
DATED : November 15, 2011  
INVENTOR(S) : Dent It is certified that error appears in the above-identified patent and that said Letters Patent is hereby corrected as shown below:

In Column 4, Line 12, delete "S," and insert -- S1, --, therefor.

In Column 4, Line 61, delete "4÷(2,2)" and insert -- 4+(2,2) --, therefor.

In Column 4, Line 62, delete "congfiguration" and insert -- configuration --, therefor.

In Column 6, Line 20, delete "(I² transmit+Q² transmit)" and insert -- ($I^2_{transmit}+Q^2_{transmit}$) --, therefor.

In Column 8, in Table 1, under "P.A. Efficiency Factor", Line 1, delete "68" and insert -- dB --, therefor.

In Column 8, Line 49, delete "station s" and insert -- station's --, therefor.

In Column 13, Line 15, in Claim 1, delete "generat" and insert -- generator --, therefor.

In Column 13, Line 22, in Claim 1, delete "or of" and insert -- or --, therefor.

Signed and Sealed this  
Thirteenth Day of March, 2012

David J. Kappos  
*Director of the United States Patent and Trademark Office*